United States Patent [19]
Ward

[11] Patent Number: 5,102,049
[45] Date of Patent: Apr. 7, 1992

[54] VANE CONTROL MECHANISM

[75] Inventor: Eric J. Ward, West Palm Beach, Fla.

[73] Assignee: The United States of America as represented by the Secretary of the Air Force, Washington, D.C.

[21] Appl. No.: 124,631

[22] Filed: Nov. 24, 1987

[51] Int. Cl.⁵ ............................................. B64C 15/02
[52] U.S. Cl. .................... 239/265.29; 60/230; 239/265.33; 244/12.5; 244/23 D; 244/52; 244/110 B
[58] Field of Search .................. 239/265.25, 265.27, 239/265.29, 265.33; 60/226.2, 230; 244/12.5, 23 D, 52, 110 B

[56] References Cited

U.S. PATENT DOCUMENTS

| | | | |
|---|---|---|---|
| 2,945,346 | 7/1960 | Arnzen | 239/265.29 |
| 3,475,913 | 11/1969 | Mortlock et al. | 239/265.29 |
| 4,358,074 | 11/1982 | Schoen et al. | 244/12.5 |
| 4,474,345 | 10/1984 | Musgrove | 244/12.5 |

Primary Examiner—Andres Kashnikow
Assistant Examiner—Michael J. Forman
Attorney, Agent, or Firm—Stanton E. Collier; Donald J. Singer

[57] ABSTRACT

A thrust reverser in a two dimensional jet engine exhaust nozzle employs a plurality of reverser apparati that maintain a constant flow throat area, for example, in the reverse throat mode. A single reverser apparatus includes an actuator that operates through a lever upon linkage and a coupler to drive a set of parallel vanes and at least one independent vane. The parallel vanes are connected by a parallelogram of links to the coupler. The independent vanes move in a manner as defined by a cam having a preselected path therein that causes the independent vanes to move in a desired manner to provide the constant throat area.

3 Claims, 2 Drawing Sheets

VANE CONTROL MECHANISM

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to jet engines, and, in particular, to thrust reversers thereon.

The use of the exhaust from jet engines to provide additional braking of the aircraft by reversing the direction of the thrust is accomplished by blocking rearward flow of the jet stream and diverting it laterally and forwardly. One type uses blocker doors swing directly behind the jet nozzle and diverging forwardly. Another type uses openings in the sidewalls of the nozzle or a surrounding shroud together with blocker doors which swing toward the engine axis to block rearward flow and extend outward to direct the diverted flow laterally and forwardly. Still another type utilizes cascade sets in the sidewalls of the jet or shroud with various means to block rearward flow and uncover the cascades. All of these have various merits and have been used successfully. Their principal problems have been cost, weight, and complexity with resultant high maintenance expense.

Several U.S. patents typifying the above features are as follows and incorporated by reference:
- U.S. Pat. No. 3,018,620
- U.S. Pat. No. 3,080,710
- U.S. Pat. No. 3,100,377
- U.S. Pat. No. 3,610,530
- U.S. Pat. No. 3,618,323

It is seen in the above that generally the jet engine exhaust nozzles are cylindrical and that the means for diverting and redirecting the exhaust gases do not take into account all of the performance requirements of high performance jet aircraft engines; for example, the exhaust nozzle may be rectangular rather than cylindrical and the engine may require a constant throat area to function properly.

This present invention is directed toward providing a means for redirecting the exhaust gases for high performance jet aircraft engines typically used on military type of aircraft in which the above problems are to be minimized.

SUMMARY OF THE INVENTION

The present invention is directly at a thrust reverser for a high performance jet engine having a two dimensional (2D) exhaust nozzle.

The 2D exhaust nozzle of the present invention is typically attached to the rear section of the aircraft on or near the afterburner section.

The exhaust nozzle of the present invention includes a housing that attaches to the afterburner section, a means for diverting the jet flow and a means for redirecting the diverted jet flow in a controlled manner.

The diverting means includes appropriate actuators that more divergent flaps in the nozzle to block the rearward flow of the engine exhaust. The diverted flow then enters the means for redirecting which includes an appropriate vane control means and reverser vanes mounted on or near the top and bottom of the exhaust nozzle. The reverser vanes in combination with the vane control means provide a constant throat area to the engine exhaust. The reverser vanes includes a set of parallel vanes and one or two independent vanes whose motion is controlled by fixed cams in the vane control means.

It is therefore one object of the present invention to provide a thrust reverser having a throat area controllable by cams that operate on independent vanes.

It is another object of the present invention to provide a thrust reverser operable within a 2D exhaust nozzle.

It is another object of the present invention to provide a thrust reverser having an actuator and control means fittable within a sidewall of the exhaust nozzle.

These and many other objects and advantages of the present invention will be readily apparent to one skilled in the pertinent art from the following detailed description of a preferred embodiment of the invention and the related drawings.

DETAILED DESCRIPTION OF THE PREFERRED EMBODIMENT

Figure 1:
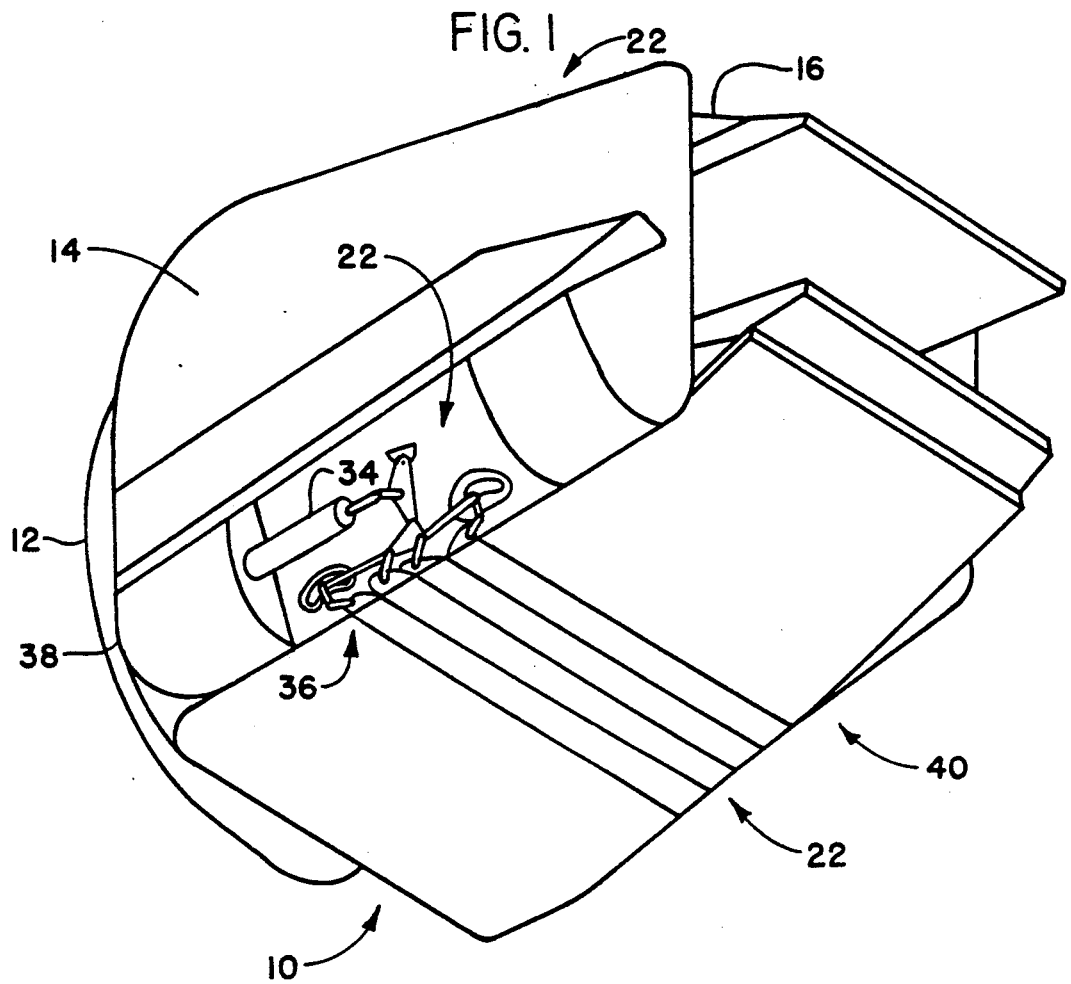
FIG. 1 illustrates by a view the exhaust nozzle with the thrust reverser means shown therein by partial cut away.

Referring to FIG. 1, a jet engine exhaust nozzle 10 is shown. The jet engine itself is not shown but is considered conventional with the exhaust nozzle 10 having a mounting flange 12 which is connected to an afterburner section, not shown.

Exhaust nozzle 10 is mounted on the sides of the jet aircraft with side 14 of housing 16 being on the exterior. Nozzle 10 is a two dimensional (2D) exhaust nozzle in that the exhaust opening is rectangularly shaped rather than circular.

Figure 2A:
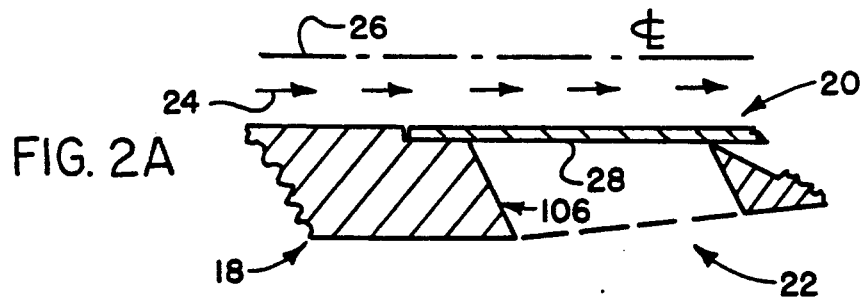
FIG. 2A and 2B illustrate by side view a partial section of a means to divert the jet flow.
Figure 2B:
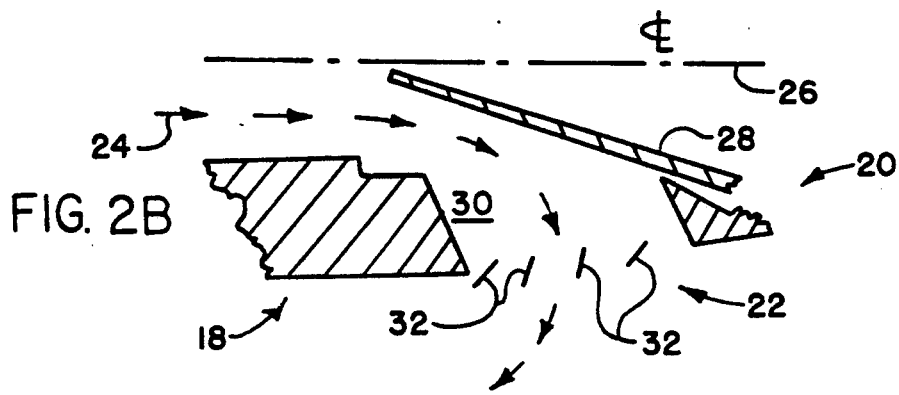

Referring to FIG. 2A, a thrust reverser 18 is shown in a diagramatic manner therein.

Thrust reverser 18 includes a flow blocking means 20 and a reverser means 22. Engine gas flow 24 is indicated by arrows and the engine axis by line 26. Actuators, not shown, cause a blocking door 28 to move into and intercept flow 24 and diverts flow 24 into a flow passage 30 having therein a set of movable vanes 32 linked to actuators, not shown. Vanes 32 are connected by linkage to the actuators.

Referring back to FIG. 1, reverser means 22 shown in a partial cut away has an actuator 34 acting through linkage 36 or vanes 22. Actuator 34 and linkage 36 are enclosed in the sidewall 38 in this embodiment. An additional set 40 of actuator 34 and linkage 36 are positioned on the opposite sidewall as that of sidewall 38, and further reverser means 22 are included in the top surface of housing 16 but not shown. Since it appears and functions the same as the lower reverser means 22 the upper reverser means 22 is not discussed. An alternate location of actuator 34 and linkage 36 would be in the center of the exhaust tunnel but this location requires more complex housing, etc., although only one set of actuator 34 and linkage 36 would be required in each reverser means 22.

Figure 3A:
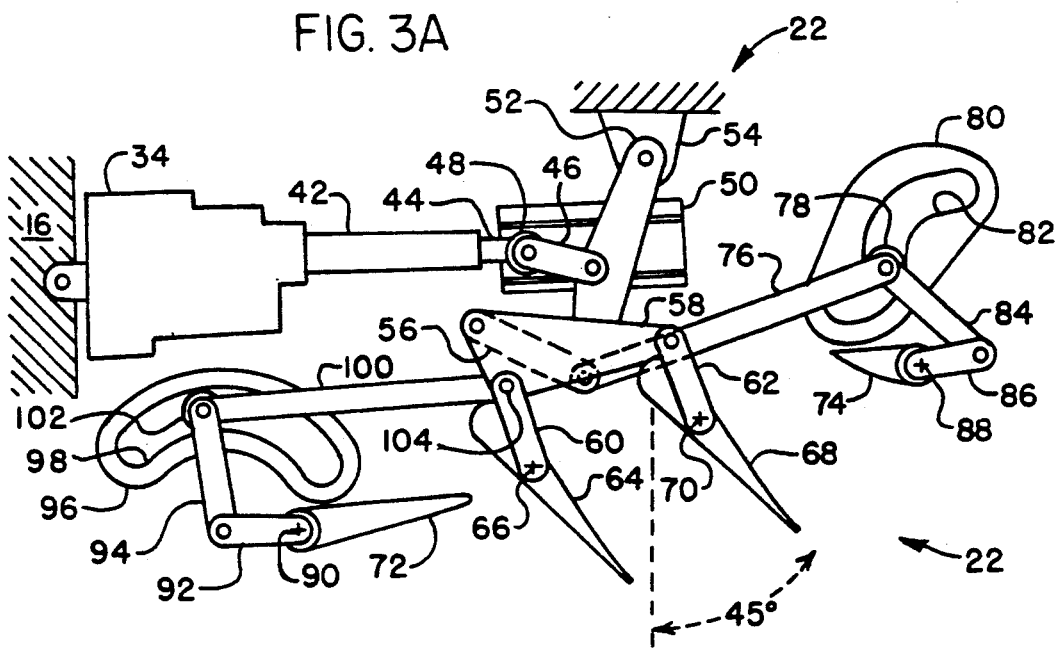
FIGS. 3A, 3B and 3C illustrate by view the sequential movement of the vanes of the present invention.
Figure 3B:
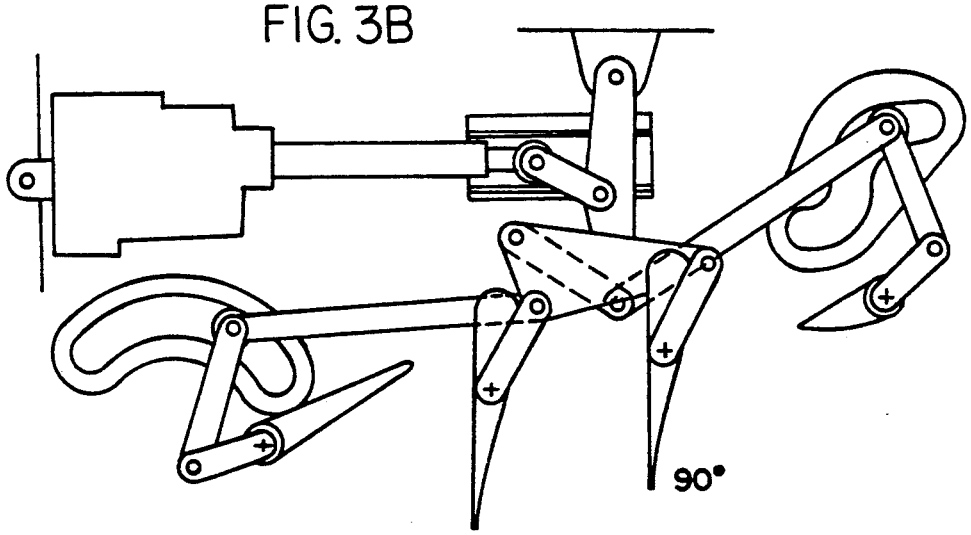
Figure 3C:
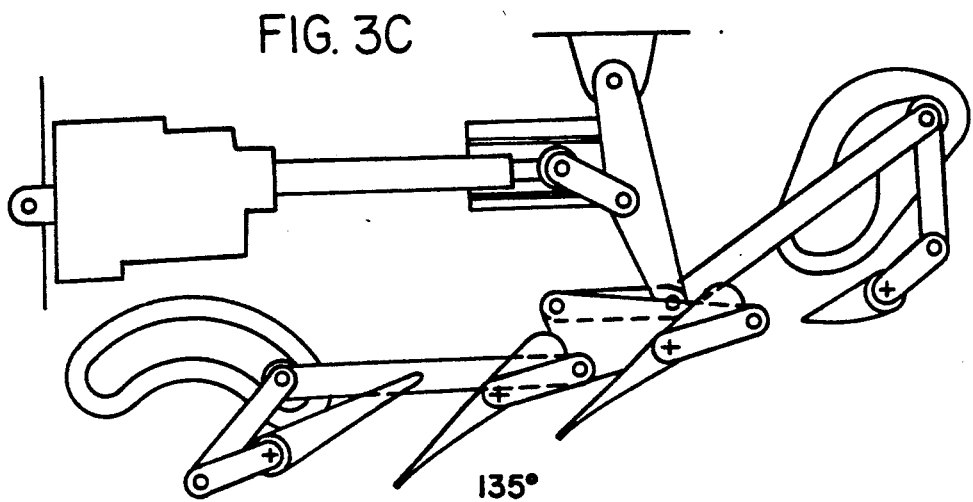

To obtain a better understanding of the reverser means 22, reference is made to FIGS. 3A, 3B and 3C which show a sequential movement of vanes 22. Referring to FIG. 3A, actuator 34 has a piston 42 with an arm 44 that is pivotally connected to a first link 46. A roller 48 also pivotally connected to arm 44 moves in a straight cam 50. First link 46 is also pivotally connected to a lever 52 that is pivotally connected to a static base 54. Arm 44 may be connected directly to level 52 which would require a shorter throw of piston 42 if actuator 34 is fixedly mounted to housing 16 or actuator 34 may be pivotally mounted to allow some rotation as piston 42 extends.

Lever 52 is pivotally connected to a second link 56 that pivotally connects to a coupler 58. Coupler 58, shown in cross hatch, has pivotally connected thereto a first vane link 60 and a second vane link 62. First vane line 60 is fixedly connected to first parallel vane 64 that pivots about point 66. Second vane link 62 is connected to second parallel vane 68 that pivots about point 70. Additional vane links and parallel vanes may be added by extending coupler 58, and as seen in FIG. 3A, a parallelogram is formed by vane links 60 and 62, and any added links. Thus parallel vanes 66 and 68 and any additional parallel vanes move in unison as coupler 58 moves.

Reverser means 22 has a first independent vane 72 and a second independent vane 74. There may be only one independent vane. The term independent vane means that the vane has a motion that is not parallel to other vanes there about.

Lever 52 has a third link 76 that is pivotally connected thereto and also about the point that the second link 56 is connected to, on lever 52.

Third link 76 has a roller 78 being a cam follower that travels in a cam 80. The preselected path 82 is determined by the particular throat area schedule requred. A cam link 84 is pivotally connected to both roller 78 and to independent vane link 86. Independent vane link 86 is fixedly connected to second independent vane 74 which pivots about point 88.

First independent vane 72 pivots about point 90 and has fixedly attached a vane link 92. Vane link 92 is pivotally connected to a cam link 94 and cam link 94 is pivotally connected to a roller 102 that follows a preselected path 98 in a cam 96. Roller 102 is pivotally connected to coupler link 100 and coupler link 100 is pivotally connected to coupler 58 at a point 104. First vane link 60 also pivots about point 104. The position of parallel vanes 64 and 68 is 45 degrees from the vertical in FIG. 3A.

The throat area schedule desired is used to determine the preselected path 98 of cam 96.

In particular, the preferred schedule requires that the throat area between the vanes be a constant. Obviously, other combinations may be selected by changing the cam paths 82 and 98.

As the prior art vanes rotated from 45° to 90°, the area between them increased. This area then decreased as the vanes rotated to 135°. However, it is necessary to provide the engine with constant flow areas as the vanes rotate. Another requirement is that the aerodynamic throats between the vanes be contained within the vane box 106. To meet these requirements, one or two vanes must rotate differently from the other vanes according to a schedule, all to be controlled by a single actuator.

There are several unique advantages of the reverser means 22:

By varying the number of parallel vanes and changing the cam path shapes, a variety of area schedules can be achieved. There are no side forces or moments created. The number of rollers is minimized. Short actuator stroke of about (2.5 in) helps minimize overall length. Attaching the actuator to other locations on the lever can reduce the force with a longer stroke, or reduce the stroke with a larger force. The configuration can be varied to fit different envelopes. Also, the overall shape fits well into nozzle sidewall compartments. A single actuator input controls all motions. The cams are fixed to the static structure.

Clearly, many modifications and variations of the present invention are possible in light of the above teachings and it is therefore understood, that within the inventive scope of the inventive concept, the invention may be practiced otherwise than specifically claimed.

What is claimed is:

1. A jet thrust reverser means for redirecting the jet flow input by a flow blocking means, a plurality of said jet thrust means operating within a two dimensional exhaust nozzle of a high performance jet engine, said thrust reverser means comprising:

an actuator means connected to said exhaust nozzle, said actuator means having a piston with an arm;
a lever means, said lever means pivotally connected to said nozzle at a nozzle pivot;
a means for pivotally connecting said arm of said actuator to said lever means;
a lever link pivotally connected to said lever means opposite said nozzle pivot;
a coupler, said coupler pivotally connected to said lever link;
a plurality of vane links, said vane links pivotally connected to said coupler in a line wherein said lever link is connected at a position perpendicular to said line;
a plurality of parallel rotatable vanes, said vanes affixed to said vane links;
at least one independent vane means being driven by said actuator, said independent vane means having at least one came therein with a preselected path such that the throat area by said parallel rotatable vanes and independent vane means varies according to a schedule, said independent vane means having at least one vane.

2. A reverser means as defined in claim 1 wherein said independent vane means includes:

at least one independent rotatable vane;
at least one independent vane link, said independent vane link connected to said independent vane;
at least one cam link, said cam link pivotally connected to such independent vane link;
at least one roller, said roller pivotally connected to said cam link;
each said at least one cam having therein a preselected path in which said at least one roller travels;
at least one means for connecting said roller operably to said actuator.

3. A reverser means as defined in claim 2 wherein there are two independent vane means, one of said vane means being an aft independent vane means and the other being a forward independent vane means.

* * * * *